United States Patent [19]

Carlos et al.

[11] Patent Number: 4,491,535

[45] Date of Patent: Jan. 1, 1985

[54] HYDROCARBON OXIDATE COMPOSITION

[75] Inventors: Donald D. Carlos, Louisville; B. Keith Friley, Catlettsburg, both of Ky.

[73] Assignee: Ashland Oil, Inc., Ashland, Ky.

[21] Appl. No.: 497,785

[22] Filed: May 25, 1983

[51] Int. Cl.$^3$ .............................................. C09K 3/00
[52] U.S. Cl. ......................... 252/389.61; 208/47; 252/389.51; 252/389.52; 252/389.54; 252/389.62; 260/404.5 PA
[58] Field of Search ............ 252/392, 403, 389.51, 252/389.52, 389.54, 389.61, 389.62; 260/404.5; 208/47

[56] References Cited

U.S. PATENT DOCUMENTS

| | | | |
|---|---|---|---|
| 3,385,858 | 5/1968 | Katz | 544/386 |
| 3,451,931 | 6/1969 | Kahn et al. | 260/404.5 PA |
| 3,483,237 | 12/1969 | Peerman et al. | 260/404.5 PA |
| 3,787,374 | 1/1974 | Adams | 544/386 |
| 4,192,812 | 3/1980 | Carlos | 260/406 |
| 4,391,610 | 7/1983 | Sung et al. | 252/392 |
| 4,422,953 | 12/1983 | Grace et al. | 252/392 |
| 4,440,666 | 4/1984 | Miller et al. | 252/392 |

*Primary Examiner*—Paul Lieberman
*Assistant Examiner*—Willie Thompson
*Attorney, Agent, or Firm*—Richard C. Willson, Jr.

[57] ABSTRACT

A hydrocarbon oxidate composition which comprises the reaction product of (a) a hydrocarbon oxidate, as described herein, or the metal salt thereof, with (b) a polyamine, as described herein, and (c) at least one copolymer of an olefin and a comonomer selected from (i) an unsaturated carboxylic acid; or (ii) a vinyl ester of a saturated carboxylic acid, wherein the hydrocarbon oxidate composition comprises a wax oxidate, a petrolatum oxidate or mixtures thereof and has a very high viscosity, increased molecular weight and sinewy characteristics and is useful as a lubricant, grease, or protective coating.

89 Claims, No Drawings

HYDROCARBON OXIDATE COMPOSITION

FIELD OF THE INVENTION

This invention relates to a hydrocarbon oxidate composition and to a method for producing the same. More specifically, this invention relates to a hydrocarbon oxidate composition which comprises the reaction product of (a) a hydrocarbon oxidate, as described herein, or the metal salt thereof, with (b) a polyamine, as described herein, and (c) at least one copolymer of an olefin and a comonomer selected from (i) an unsaturated carboxylic acid; or (ii) a vinyl ester of a saturated carboxylic acid, as described herein, wherein the hydrocarbon oxidate composition comprises wax oxidate, petrolatum oxidate or mixtures thereof and has a very high viscosity, increased molecular weight and sinewy characteristics.

BACKGROUND OF THE INVENTION

Oxidized petroleum fractions, which fractions include waxes and petrolatums, are known as a source of saponifiable material useful in the production of lubricating greases and in the formulation of protective coatings.

Highly oxidized petroleum fractions and processes for their production are described in U.S. Pat. Nos. 4,186,077 and 4,198,285. Oxidation of petroleum fractions, e.g., petrolatums, utilizing the processing conditions described in these two U.S. patents provides oxidates having high acid numbers which have advantageous properties over oxidates produced in accordance with previous oxidation techniques.

While oxidates produced conventionally and in accordance with the processes disclosed in the above-described U.S. patents have advantageous properties, the viscosity, molecular weight and integrity of these oxidate products are not completely sufficient for all applications and improvements in these and other desired characteristics of oxidate products are needed.

In copending application Ser. No. 271,906, filed June 9, 1981, entitled Petrolatum or Hydrocarbon Wax Oxidate Composition, a polyamine is admixed with a petrolatum or hydrocarbon wax oxidate to improve various properties thereof related to their use as protective coatings. When coated, these formulations exhibit good film forming properties with significant corrosion and weathering resistance. However, low petrolatum content coatings do not provide adequate salt spray resistance. This is especially apparent with formulations containing 100% hydrocarbon wax oxidate, i.e., a minimal content of petrolatum oxidate. This disadvantage is important in view of the decreasing supply of petrolatum and quality control thereof.

SUMMARY OF THE INVENTION

Accordingly, an object of this invention is to provide a hydrocarbon oxidate composition having high viscosity and increased molecular weight.

Another object of this invention is to provide a film forming hydrocarbon oxidate composition exhibiting superior weathering resistance when applied as a protective coating.

A further object of this invention is to provide a process for producing said high-viscosity hydrocarbon oxidate composition.

An even further object of this invention is to provide a process for increasing the molecular weight, viscosity and salt spray resistance of a hydrocarbon oxidate.

Also, an object of this invention is to provide compositions containing the high-viscosity hydrocarbon oxidate composition where the compositions are useful as lubricants, greases, corrosion inhibitor compositions, protective coating compositions and the like.

These and other objects are achieved by the invention described herein.

In one embodiment, the present invention provides a hydrocarbon oxidate composition which comprises the reaction product of (a) a hydrocarbon oxidate composition comprising a wax oxidate, a petrolatum oxidate or mixtures thereof with (b) a polyamine having at least two amino groups, each of which has at least one active hydrogen atom, and (c) at least one copolymer comprising an olefin and a comonomer selected from (i) an unsaturated carboxylic acid containing from 3 to 5 carbon atoms or; (ii) vinyl esters of saturated carboxylic acids, said esters containing 4 to 14 carbon atoms; or the metal salt of such reaction product.

In a further embodiment, the present invention provides a method of producing a high-viscosity hydrocarbon oxidate composition comprising reacting (a) a hydrocarbon oxidate composition comprising a wax oxidate, a petrolatum oxidate or mixtures thereof with (b) a polyamine having at least two amino groups, each of which has at least one active hydrogen atom (c) at least one copolymer comprising an olefin and a comonomer of (i) an unsaturated carboxylic acid or; (ii) vinyl esters of a saturated carboxylic acid and (d) a metal salt forming compound to produce the reaction product or the metal salt thereof described above.

An even further embodiment of this invention provides a method for altering the characteristics of hydrocarbon oxidates or the metal salts thereof comprising reacting the hydrocarbon oxidate or metal salt thereof with said polyamine having at least two amino groups, in which each amino group has at least one active hydrogen atom and with said olefin/acid or ester copolymer.

DETAILED DESCRIPTION OF THE INVENTION

In this invention, the starting material used is a hydrocarbon oxidate comprising a wax oxidate, a petrolatum oxidate or mixtures thereof or a metal salt thereof. Such a hydrocarbon oxidate comprises the oxidation product having a high acid number obtained on oxidizing a hydrocarbon wax, a petrolatum or a mixture of a petrolatum and a hydrocarbon wax.

The mixture of the wax oxidate and petrolatum oxidate can be prepared by either pre-mixing the hydrocarbon wax and the petrolatum and then oxidating the mixture or by oxidizing the hydrocarbon wax and the petrolatum separately and then mixing the resulting oxidates.

Exemplary hydrocarbon starting materials and techniques for producing by oxidation the hydrocarbon oxidate used in this invention are described in U.S. Pat. No. 4,186,077 and U.S. Pat. No. 4,198,285, issued to one of the co-inventors herein, the disclosure of which is incorporated herein by reference.

Particularly, suitable hydrocarbon wax feed stocks which can be used and oxidized to obtain the hydrocarbon wax oxidate suitable for use in this invention are hydrocarbons comprising a mixture of straight and branched chain saturated hydrocarbons having on the average 20 to 50 carbon atoms per molecule and an oil content of 10 to 30% by weight, preferably 12 to 22% by weight. In particular, preferred hydrocarbon waxes which can be oxidized to produce a particularly useful starting material are hydrocarbon waxes containing about 20 to about 44 carbon atoms. Suitable petrolatum feed stocks are petrolatums containing about 40 to about 100 carbon atoms. Useful hydrocarbon oxidates may also be produced by oxidation of mixtures thereof.

Suitable hydrocarbon oxidates which can be used in this invention can be appropriately prepared by oxidizing these hydrocarbon feed stocks as described above using processes known in the art. Such a hydrocarbon oxidate will be suitable for use herein if the oxidate has an acid number of about 35 to about 120, preferably 70 to about 120 for a hydrocarbon wax oxidate and preferably about 35 to about 55 for a petrolatum oxidate and in between for a mixture thereof. When oxidizing mixtures of hydrocarbon wax and petrolatum, a suitable acid number will be generally proportional to the proportion of the hydrocarbon wax and the petrolatum present. As used herein, the term "acid number" is defined to mean the number of milligrams of potassium hydroxide required to neutralize 1 gram of sample.

As set forth above, a hydrocarbon wax oxidate, a petrolatum oxidate or a mixture thereof, or a metal salt thereof, can be used as a starting material in this invention. For simplicity in the disclosure to be given hereinafter, the term "oxidate" will be employed throughout and such term is intended to include not only the hydrocarbon oxidate per se, but also to include the metal salt thereof.

As described above, the hydrocarbon wax, the petrolatum or mixture thereof is simply oxidized using conventional known techniques, for example, using conventional redox catalysts such as manganese salts. Further, the technique disclosed in U.S. Pat. No. 4,186,077, in which an oxidate is obtained by blowing an oxidizing gas through a liquid mass of the hydrocarbon in the presence of an amine oxide under the conditions as described therein, can be used. Alternatively, an oxidate appropriate for use in this invention can be obtained by oxidizing a hydrocarbon in accordance with the procedure described in U.S. Pat. No. 4,198,285 by blowing an oxidizing gas through a liquid mass of the hydrocarbon in the presence of a sulfobetaine.

To produce the high viscosity oxidate composition of this invention, it is only necessary to react the oxidate with (a) a polyamine having at least two amino groups in which each of the groups has at least one active hydrogen atom and (b) the herein-described olefin copolymer.

Suitable polyamines which can be employed include diamines, triamines, tetramines, pentamines and higher polyamines. For simplicity in the disclosure hereinafter, the term "polyamine" will be employed to describe suitable amines which can be employed having at least two amino functional groups, each group of which has at least one active hydrogen atom. Specific examples of appropriate polyamines which can be employed include aliphatic and alicyclic polyamines such as monoethylene diamine (MEDA), diethylene triamine (DETA), triethylene tetramine (TETA), tetraethylene pentamine (TEPA), sym.-dimethylethylene diamine, hexamethylene diamine (HMDA), N,N'-diethylethylene diamine, 1,3-(or 1,2-)diaminopropane, 1,4-diaminobutane, 1,2-diaminocyclohexane, 1,10-diaminodecane, 1,12-diaminododecane, 1,7-diaminoheptane, 1,3-diamino-N-(b-hydroxyethyl)-propane, 1,3-diamino-2-hydroxypropane, 1,5-diaminopentane, 1,8-diaminooctane, 1,2-diamino-2-methylpropane, 1,8-diamino-p-menthane, diaminomaleonitrile, N-methylethylene diamine, N-ethylethylene diamine, N,N'-diethyl-2-butene-1,4-diamine, m-xylylene diamine, 1,6-hexane diamine, N,N'-dimethyl-1,6-hexane diamine, 2,5-dimethyl-2,5-hexane diamine, and the like, aromatic polyamines such as o-(or m- or p-)phenylene diamine, 4,5-dimethyl-o-phenylene diamine, 2,4-(or 2,6- or 3,4-)diaminotoluene, 4-chloro-m-phenylene diamine, 3,4-(or 3,5-)diaminobenzoic acid, 4,4-diaminodiphenyl amine, 3,4-diaminobenzophenone, 4,4'-diaminostilbene, 3,3'-diaminobenzidine, 2,5-diaminobenzenesulfonic acid, 4,4'-methylenedianiline, 1,2-(or 1,4-; 1,5- or 2,6-)diaminoanthraquinone, 3,6-diaminoacridine, 4,5-diaminoacenaphthene, 2,3-(or 2,7-)diaminofluorene, 1,2-(or 1,5-; 1,8- or 2,3-)diaminonaphthalene, 9,10-diaminophenanthrene, 1,8-diamino-4,5-dihyroxyanthraquinone, 4-methoxy-o-phenylene diamine, 4,4'-diaminodiphenyl ether and the like, and heterocyclic polyamines such as 2,3-(or 2,6- or 3,4-)diaminopyridine, 3,5-diamino-2,6-dimethoxypyridine, N-(2-aminoethyl)-piperidine, 4-(aminomethyl)-piperidine, 4-amino-2,2,6,6-tetramethylpiperidine, 5-aminoindole, 6-aminoindoline, 4-amino-5-aminomethyl-2-methylpyrimidine, 4,5-diamino-6-hydroxypyrimidine, 4,6-diamino-5-nitropyrimidine, 4,5-(or 4,6-)diaminopyrimidine, 2,4,5,6-tetraaminopyrimidine, 2,4,6-triaminopyrimidine, 2-aminobenzimidazole, 3,4-diamino-5-hydroxypyrazole, 3,5-diamino-1,2,4-triazole, piperazine, and the like. Triethylene tetramine (TETA), diethylene triamine (DETA), tetraethylene pentamine (TEPA), piperazine, hexamethylene diamine (HMDA), monoethylene diamine (MEDA) are preferred with tetraethylene pentaamine being particularly preferred. Polyfunctional amino group containing nitrogen compounds from hydrogenated coal or shale oil can also be used as the polyamine.

From the above, it can be generally said that any polyamine having at least two amino groups in which each amino group contains at least one active hydrogen atom can be used as the polyamine in this invention. Other amino groups can be present as long as the polyamine has at least two amino groups as described above.

The copolymer employed herein comprises as one major component thereof, an olefin containing from 2 to 4 carbon atoms. The second major component thereof, contains at least one of (i) an unsaturated carboxylic acid containing from 3 to 5 carbon atoms; or (ii) a vinyl ester of a saturated carboxylic acid, said ester containing 4 to 14 carbon atoms. Preferably, the copolymer does not contain additional comonomers although each of the acid and ester types can be present.

Ethylene is the preferred olefin although olefins such as propylene, 1-butene and isobutylene can be used to obtain similar results.

The unsaturated carboxylic acid used in the present invention can be a mono- or di-carboxylic acid. Acrylic acid is the preferred unsaturated carboxylic acid although other unsaturated carboxylic acids such as methacrylic acid, crotonic acid and itaconic acid can be used to achieve the same results.

Vinyl acetate is the preferred vinyl ester of a saturated carboxylic acid although other vinyl esters of saturated carboxylic acids such as vinyl propionate, vinyl butanoate and vinyl laurate can be used to achieve the same results.

Preferred copolymers used in the present invention include ethylene-acrylic acid and ethylene-vinyl acetate.

The ethylene-acrylic acid copolymer employed in the present invention has an acid number between 5 to 120 preferably 10 to 80.

The ethylene-acrylic acid copolymer employed in the present invention has an acrylic acid concentration of between 0.64 to 15.4% by weight, preferably 1.3 to 10.3% by weight.

The ethylene-vinyl acetate copolymer employed in the present invention has a vinyl-acetate concentration of between 2 to 80% by weight preferably 5 to 60% by weight.

While the mode of action of the copolymer component is not well known, it is believed that the acrylic acid copolymer, due to its reactive groups, chemically reacts with one or more of the lime, the polyamine and the oxidate. On the other hand, the ethylene-vinyl acetate copolymer may chemically react with at least one of the oxidate and polyamine or merely be in an admixture therewith.

The reaction of the oxidate with the polyamine and copolymer component can be conducted at a temperature of about room temperature (e.g., about 20° to 30° C.) to a temperature just below the point at which the reactants would be thermally degraded, generally about 70° F. to about 350° F. (about 21° C. to about 176.5° C.), more generally, 200° F. to 250° F. (93° C. to 121° C.) under atmospheric pressure. Subatmospheric pressure or superatmospheric pressure can also be used, if desired.

The time of reaction for the polyamine and copolymer component with the oxidate is not critical and will vary depending on the reactants and the temperature employed. In general, an appropriate time of reaction can be determined by measuring the viscosity characteristics of the produced high viscosity oxidate composition. In general, high-viscosity oxidate compositions of this invention have a viscosity of about 1000 to about 250,000 CPS, more preferably about 2,500 to 35,000 CPS, at about 25° C.

The oxidate composition of this invention is considered to have a high-viscosity, i.e., a viscosity of about 1000 to about 250,000 CPS at about 25° C., which is markedly higher than the viscosity range generally encountered in prior art hydrocarbon oxidates of about 10 to about 200 CPS at about 25° C. and for the calcium salts thereof of about 200 to about 8000 CPS at about 25° C. Further, the viscosity of the oxidate composition of this invention can be adjusted by addition thereto of appropriate additives such as compatible solvents (e.g., mineral spirits) or by the addition of small amounts (less than 1.0%) of water, if desired.

As indicated above, in one embodiment of this invention, by reacting the oxidate with a polyamine and copolymer component, the characteristics possessed by the oxidate prior to the reaction with a polyamine and copolymer component are altered. For example, the viscosity of the oxidate used as a starting material is less than that of the oxidate reaction product. Further, the oxidate reaction product has more sinewy characteristics than the oxidate starting material. In addition, increased clarity and consistency are obtained with the compositions of this invention. Also, where the composition of this invention is used as a protective coating or film, freedom from film graininess, improved film drying, improved film cohesiveness and improved corrosion and weather resistance are achieved.

In the reaction between the polyamine, copolymer component and the oxidate, an appropriate ratio of the oxidate to the polyamine to the copolymer component is about 350:1:5 to about 550:10:50 by weight, preferably about 400:1:15 to about 450:5:40 by weight.

The reaction product of the oxidate with the polyamine and copolymer component of this invention can be advantageously employed to produce greases, lubricants, corrosion inhibitor compositions, protective coatings, etc. Particularly, the oxidate reaction product is capable of forming a film which is free of graininess, which is cohesive and which does not crack. Accordingly, the use of such as a grease or lubricant for machinery, automobiles, aircraft, marine craft, etc., as a protective coating for such or as a corrosion resistant composition to protect any type of metal surface from, e.g., oxidation, or other alteration, is particularly advantageous. That is, the oxidate composition of this invention is useful in protecting metal surfaces from the effects of salt spray, humidity, and like external conditions. Without such protection, deleterious effects on the metal surfaces arise.

As indicated above, the oxidate of this invention can comprise the reaction product of a hydrocarbon oxidate with a polyamine and copolymer component or the metal salt of the reaction product of the oxidate, the polyamine and copolymer. Where metal salts (sometimes designated a "soap") are desired, any basic metal salt can be used. Suitable metal salts include those of lithium, sodium, potassium, magnesium, rubidium, strontium, cesium, barium, cadmium, aluminum, tin, bismuth, zinc and mixtures thereof. Preferred salts, particularly for protective coating film applications, are zinc and calcium salts and appropriate basic calcium and zinc salts such as calcium hydroxide, calcium oxide, zinc oxide and the like can be used. Calcium salts of the reaction product of this invention are particularly useful in preparing relatively firm, dry and non-tacky protective coating films. Zinc salts of the reaction product of this invention are particularly useful in preparing softer protective coating films.

More specifically, the metal salt oxidate, i.e. soap, of the present invention can be prepared by combining (1) a compatible solvent in an amount of from 30 to 60% by weight, preferably 40 to 50% by weight, (2) copolymer component to be used in an amount of from 0.5 to 5% by weight, preferably 1.5 to 4% by weight, (3) lime in an amount of from 1 to 5% by weight, preferably 2 to 3.5% by weight, with the higher concentration of lime being used with higher acid number oxidates, (4) polyamine in an amount of from 0.1 to 1% by weight, preferably 0.1 to 0.5% by weight, and (5) monoalkyl ethers of ethylene glycol in an amount of from 1 to 10% by weight, preferably 3 to 7% by weight in a preweighed container of appropriate size. Addition steps (2)–(5) can be carried out in any order as long as the materials are weighed into the container prior to heating. The resulting slurry is heated with stirring. A loosely fitted cover may be placed over the container, with openings for a stirrer and thermometer, in order to allow some evaporation of solvent, water, azeotropes, etc. to occur. At approximately 100° to 170° F., molten hydrocarbon oxidate in an amount of from 35 to 55% by weight, preferably 40 to 45% by weight, is added to the container with stirring. The temperature is then raised to about 200° to 250° F., preferably 210° to 225° F., and the mixture is allowed to react until the desired viscosity is reached, generally 0.5 to 24 hours; with small batches, 0.5 to 4 hours, preferably 0.75 to 2 hours.

After reacting, stirring and heating are discontinued and the container is reweighed. Any difference in weight before and after heating is made up with a compatible solvent.

After the addition of the compatible solvent, various additives such as the metal salts of petroleum sulfonates in the range of 1 to 15% by weight, preferably 2 to 8% by weight, can be added to the mixture with continuous stirring until the product cools to about 175° to 70° F., preferably 120° to 90° F. The container cover may be removed while cooling. When the product has cooled to about 175° to 70° F., preferably 120° to 90° F., stirring is discontinued and the product is allowed to cool to room temperature and equilibrate overnight.

Monoalkyl ethers of ethylene glycol employed in the above-described process include ethylene glycol monobutyl ether; monoethyl ether and monomethyl ether.

Other conventional additives such as thinners, organic clays, pigments and the like, for known purposes and in conventional amounts, can also be added to the compositions of this invention to produce a broad range of different types of useful products.

The following examples are given to illustrate the present invention in greater detail. These examples are to be construed as merely exemplary and non-limiting. Unless otherwise indicated, all parts, percents, ratios, and the like are by weight.

The ethylene-vinyl acetate and ethylene-acrylic acid copolymers employed in the Examples described hereinafter are commercially available from Allied Chemical Corporation. The properties of these copolymers are set forth in Table I below:

TABLE 1

I. Ethylene - Vinyl Acetate Copolymers

| Copolymer | % Vinyl Acetate | Softening Point (°F.) | Hardness (dmm) | Density (g/ml) | Brookfield Vis. (284° F.) cps |
|---|---|---|---|---|---|
| A | 14 | 204 | 9.5 | 0.92 | 550 |
| B | 2 | 215 | 7.0 | 0.91 | 275 |
| C | 26 | 140 | 80.0 | 0.93 | 600 |
| D | 40 | Viscous Liquid | | 0.94 | 350 |

II. Ethylene - Acrylic Acid Copolymers

| Copolymer | Acid Number | Softening Point (°F.) | Hardness (dmm) | Density (g/ml) | Brookfield Vis. (284° F.) cps |
|---|---|---|---|---|---|
| E | 40 | 226 | 2.0 | 0.93 | 500 |
| F | 75 | 215 | 4.0 | 0.93 | 650 |
| G | 120 | 198 | 11.5 | 0.93 | 650 |

Comparative Example A

A hydrocarbon wax oxidate with an acid number of 92.0 and an oil content of 13% by weight, produced by conventionally oxidizing a hydrocarbon wax starting material, was used.

Mineral spirits (301.0 grams) was placed in a preweighed 1 liter beaker and 18.2 grams of lime, in powder form, was dusted into the mineral spirits with continuous mixing to form a lime slurry. Next, 1.85 grams of tetraethylene-pentamine (hereinafter TEPA) was added dropwise to the slurry along with 3.1 grams of ethylene glycol monobutyl ether (hereinafter butyl cellosolve) and 0.0 grams of a copolymer. Heating was then initiated along with stirring of the slurry. Aluminum foil, with holes to allow the stirrer rod and thermometer to fit through, was placed over the beaker. The foil was fitted loosely around the beaker so that some evaporation could take place. At approximately 120°–150° F., the molten (150° to 200° F.) hydrocarbon wax oxidate (299.8 grams) was added to the beaker slowly with continuous stirring. The temperature was then raised to 210°–220° F. and the mixture was allowed to react with stirring. After 1 hour of reaction, stirring was discontinued, heating stopped and the beaker was reweighed. Any difference between the weight of the components before and after heating was made up with mineral spirits, i.e., 9.1 grams, (hereinafter referred to as "make-up"). After "make-up", 30.9 grams of calcium sulfonate was added to the slurry with continuous stirring until the product had cooled to approximately 120° F. The foil was removed while cooling. When the product cooled to approximately 120° F., and stirring was discontinued, the product was capped and allowed to cool to room temperature and equilibrate overnight. The resulting product was a 100% hydrocarbon wax oxidate soap.

EXAMPLE 1

The same procedures set forth in Comparative Example A were repeated except that 301.5 grams of mineral spirits, 17.9 grams of lime and 9.0 grams of Copolymer E (emulsifiable) were employed along with 291.3 grams of the hydrocarbon wax oxidate. Further, 13.6 grams of mineral spirits was used as the "make-up". The resulting product was a 97% hydrocarbon wax oxidate, 3% Copolymer E soap.

EXAMPLE 2

The same procedures set forth in Comparative Example A were repeated except that 300.4 grams of mineral spirits, 17.8 grams of lime and 12.0 grams of Copolymer E (emulsifiable) were employed along with 288.3 grams of the hydrocarbon wax oxidate. Further, 15.0 grams of mineral spirits was used as the "make-up". The resulting product was a 96% hydrocarbon wax oxidate, 4% Copolymer E soap.

EXAMPLE 3

The same procedures set forth in Comparative Example A were repeated except that 330.0 grams of mineral spirits, 17.7 grams of lime, and 15.0 grams of Copolymer E (emulsifiable) were employed along with 284.8 grams of the hydrocarbon wax oxidate. Further, 30.8 grams of mineral spirits was used as the "make-up". The resulting product was a 95% hydrocarbon wax oxidate, 5% Copolymer E soap.

COMPARATIVE EXAMPLE B

A hydrocarbon wax-petrolatum oxidate prepared by cooxidizing a wax having an oil content of 13% by weight with 50% by weight of the starting material of a petrolatum, the oxidized product having an acid number of 66.5, was used.

The same procedures set forth in Comparative Example A were repeated except that 300.0 grams of mineral spirits, 13.2 grams of lime, and 30.7 grams of calcium sulfonate were employed along with 302.2 grams of the above hydrocarbon wax-petrolatum oxidate. Further, 21.6 grams of mineral spirits was used as the "make-up". The resulting product was a 100% hydrocarbon wax-petrolatum oxidate soap.

EXAMPLE 4

The same procedures set forth in Comparative Example B were repeated except that 12.6 grams of lime, 1.84 grams of TEPA, 30.6 grams of calcium sulfonate, and 12.0 grams of Copolymer D were employed along with 286.7 grams of the hydrocarbon wax-petrolatum oxidate. Further, 18.0 grams of mineral spirits were used as the "make-up". The resulting product was 96% hydrocarbon wax-petrolatum oxidate, 4% Copolymer D soap.

EXAMPLE 5

The same procedures set forth in Comparative Example B were repeated except that 15.6 grams of lime, 30.8 grams of calcium sulfonate and 15.0 grams of Copolymer A were employed along with 286.3 grams of the hydrocarbon wax-petrolatum oxidate. Further, 6.7 grams of mineral spirits was used as the "make-up". The resulting product was a 95% hydrocarbon wax-petrolatum oxidate, 5% Copolymer A soap.

EXAMPLE 6

The same procedures set forth in Comparative Example B were repeated except that 16.2 grams of lime, 30.8 grams of calcium sulfonate and 12.0 grams of Copolymer E (emulsifiable) were employed along with 288.6 grams of the hydrocarbon wax-petrolatum oxidate. Further, 11.6 grams of mineral spirits was used as the "make-up". The resulting product was a 96% hydrocarbon wax-petrolatum oxidate, 4% Copolymer E soap.

EXAMPLE 7

The same procedures set forth in Comparative Example B were repeated except that 1000 grams of mineral spirits, 53.8 grams of lime, 6.2 grams of TEPA, 102.7 grams of calcium sulfonate, 10.3 grams of butyl cellosolve and 50.0 grams of Copolymer E (powder) were employed along with 956.3 grams of the hydrocarbon wax-petrolatum oxidate. Further, 29.3 grams of mineral spirits was used as the "make-up". The resulting product was a 95% hydrocarbon wax-petrolatum oxidate, 5% Copolymer E soap.

EXAMPLE 8

The same procedures set forth in Comparative Example A were repeated except that the reaction time was 1.75 hours, 1200.3 grams of a hydrocarbon wax oxidate having an acid number of 95.5 and an oil content of 18% by weight, 1263.2 grams of mineral spirits, 78.1 grams of lime, 7.8 grams of TEPA, 130.0 grams of calcium sulfonate, 13.0 grams of butyl cellosolve and 63.2 grams of Copolymer E (powder) were employed. Further, 68.0 grams of mineral spirits was used as the "make-up". The resulting product was a 95% hydrocarbon wax oxidate, 5% Copolymer E soap.

EXAMPLE 9

The same procedures set forth in Example 8 were repeated except that 78.9 grams of lime, 130.3 grams of calcium sulfonate were employed along with 1200.6 grams of the hydrocarbon wax oxidate. Further 68.5 grams of mineral spirits was used as the "make-up". The resulting product was a 95% hydrocarbon wax oxidate, 5% Copolymer E soap.

EXAMPLE 10

The same procedures set forth in Comparative Example A were repeated except that 297.8 grams of a hydrocarbon wax oxidate having an acid number of 95.5 and an oil content of 18% by weight, 300.0 grams of mineral spirits, 19.0 grams of lime, 1.86 grams of TEPA, 31.0 grams of calcium sulfonate, 3.1 grams of butyl cellosolve, 1.5 grams of Copolymer A and 1.5 grams of Copolymer E (powder) were employed. Further, 13.0 grams of mineral spirits was used as the "make-up". The resulting product was a 99% hydrocarbon wax oxidate, 0.5% Copolymer A, 0.5% Copolymer E soap.

EXAMPLE 11

The same procedures set forth in Example 10 were repeated except that 18.8 grams of lime, 30.9 grams of calcium sulfonate, 3.0 grams of Copolymer A and 3.0 grams of Copolymer E (powder) were employed along with 294.1 grams of the hydrocarbon wax oxidate. Further, 11.9 grams of mineral spirits was used as the "make-up". The resulting product was a 98% hydrocarbon wax oxidate, 1.0% Copolymer A, 1% Copolymer E soap.

EXAMPLE 12

The same procedures set forth in Example 11 were repeated except that 18.7 grams of lime, 12.4 grams of calcium sulfonate, and 6.0 grams of Copolymer C were employed along with 294.3 grams of the hydrocarbon wax oxidate. Further, 10.4 grams of mineral spirits was used as the "make-up". The resulting product was a 98% hydrocarbon wax oxidate, 2% Copolymer C soap.

EXAMPLE 13

The same procedures set forth in Example 12 were repeated except that 18.4 grams of lime, 1.5 grams of Copolymer C, and 1.5 grams of Copolymer E (powder) were employed along with 296.4 grams of the hydrocarbon wax oxidate. Further, 11.8 grams of mineral spirits was used as the "make-up". The resulting product was a 99% hydrocarbon wax oxidate, 0.5% Copolymer C, 0.5% Copolymer E soap.

EXAMPLE 14

The same procedures set forth in Example 12 were repeated except that 18.2 grams of lime, 1.85 grams of TEPA, 3.0 grams of Copolymer C and 3.0 grams of Copolymer E were employed along with 295.4 grams of the hydrocarbon wax oxidate. Further, 12.0 grams of mineral spirits was used as the "make-up". The resulting product was a 98% hydrocarbon wax oxidate, 1% Copolymer C, 1% Copolymer E soap.

EXAMPLE 15

The same procedures set forth in Example 14 were repeated except that 6.0 grams of Copolymer C and 3.0 grams of Copolymer E were employed along with 291.5 grams of the hydrocarbon wax oxidate. Further, 10.0 grams of mineral spirits was used as the "make-up". The resulting produce was 97% hydrocarbon wax oxidate, 2% Copolymer C, and 1% Copolymer E soap.

EXAMPLE 16

The same procedures set forth in Example 14 were repeated except that 18.3 grams of lime, 4.5 grams of Copolymer C and 4.5 grams of Copolymer E were employed along with 291.1 grams of the hydrocarbon wax oxidate. Further, 13.0 grams of mineral spirits was used as the "make-up". The resulting product was a 97% hydrocarbon wax oxidate, 1.5% Copolymer C, and 1.5% Copolymer E soap.

EXAMPLE 17

The same procedures set forth in Example 16 were repeated except that 18.5 grams of lime, 1.9 grams of TEPA, 24.8 grams of calcium sulfonate and 3.0 grams of Copolymer E were employed along with 293.0 grams of the hydrocarbon wax oxidate. Further, 11.5 grams of mineral spirits was used as the "make-up". The resulting product was a 97.5% hydrocarbon wax oxidate, 1.5% Copolymer C, 1.0% Copolymer E soap.

EXAMPLE 18

Copolymer C and 6.0 grams of Copolymer E were employed along with 290.4 grams of the hydrocarbon wax oxidate. Further, 12.2 grams of mineral spirits was used as the "make-up". The resulting product was a 97% hydrocarbon wax oxidate, 1% Copolymer C, 2% Copolymer E soap.

The viscosity, film characteristics and salt spray resistance of the Examples described above are set forth in Tables II–IV below. Viscosities were measured conventionally with a Brookfield Model RVT viscometer with the appropriate spindle employed based on the estimated viscosity range of the final reaction product. All films were formed by dipping or pouring the products onto SAE 1010CR steel panels. Salt spray tests were conducted conventionally according to ASTM B117-64.

TABLE II

Soaps of 92.0 Acid No. Hydrocarbon Wax Oxidate, 0.3 Wt. % TEPA 5 Wt. % Calcium Sulfonate, 0.5% Butyl Cellosolve

| Example | Stochiometric % Lime | Wt. %+ Copolymer E | Brookfield Vis. 2.5 RPM | Brookfield Vis. 20 RPM | Film Thickness (MILS) | Film Characteristics | Salt Spray (Hrs to Failure) | Comments |
|---|---|---|---|---|---|---|---|---|
| Comparative A | 100 | — | 4,032 | 4,395 | 6 | Slightly tacky after 2 days, smooth, compatible | 200 | Film washed off, excessive rusting |
| Ex. 1 | 100 | 3 | 4,760 | 4,780 | 5 | Dry, smooth, compatible | 500 | Film washed off, rusted badly |
| Ex. 2 | 100 | 4 | 5,200 | 5,270 | 4 | Dry, smooth, compatible | 1000+ | Rusting at top edges |
| Ex. 3* | 100 | 5 | 37,200 | 33,750 | 12 | Dry, smooth, compatible | 1000+ | Negligible rust at top edges |

*Example 3 had 10% extra mineral spirits added to reduce the viscosity.
+Approximate weight % based on the hydrocarbon oxidate used.

TABLE III

Soaps of 66.5 Acid No. Hydrocarbon Wax-Petrolatum Oxidate 0.3 Wt. % TEPA, 5 Wt. % Calcium Sulfonate and 0.5% Butyl Cellosolve

| Example | Stochiometric % Lime | Wt. %+ Copolymer A | Wt. %+ Copolymer D | Wt. %+ Copolymer E | Brookfield Vis. 2.5 RPM | Brookfield Vis. 20 RPM | Film Thickness (MILS) | Film Characteristics | Salt Spray (Hrs to Failure) | Comments |
|---|---|---|---|---|---|---|---|---|---|---|
| Comparative B | 100 | — | — | — | 64 | 80 | <1.0 | Dry, homogenous, smooth | 625 | <5% corrosion |
| Ex. 4 | 100 | — | 4 | — | 32 | 66 | <1.0 | Dry, smooth, glossy | 1000+ | Excellent pass |
| Ex. 5 | 125 | 5 | — | — | 1520 | 1520 | 4.0 | Dry, smooth | 1000+ | Excellent pass |
| Ex. 6 | 125 | — | — | 4 | 1776 | 1660 | 2.0 | Dry, homogenous | 1000+ | Excellent pass |
| Ex. 7 | 125 | — | — | 5 | 5280 | 4960 | 2.0 | Dry, homogenous | 1000+ | Excellent pass |

+Approximate weight % based on the hydrocarbon oxidate used.

The same procedures set forth in Example 17 were repeated except that 1.85 grams of TEPA, 3.0 grams of

TABLE IV

Soaps of 95.5 Acid No. Hydrocarbon Wax Oxidate, 0.3 Wt. % TEPA and 0.5% Butyl Cellosolve

| Example | Wt. % Calcium Sulfonate | Stochiometric % Lime | Wt. %+ Copolymer A | Wt. %+ Copolymer C | Wt. %+ Copolymer E | Brookfield Vis. 2.5 RPM | Brookfield Vis. 20 RPM | Film Thickness (MILS) | Film Characteristics | Salt Spray (Hrs to Failure) | Comments |
|---|---|---|---|---|---|---|---|---|---|---|---|
| Comparative A* | 5 | 100 | — | — | — | 4,032 | 4,395 | 6 | Sl. tacky after 2 days, smooth, compat. | 200 | Film washed off, excessive rusting |
| Ex. 8 | 5 | 101 | — | — | 5 | 18,720 | 16,950 | 5 | Dry, smooth | 1000+ | Absolutely perfect passes |
| Ex. 9 | 5 | 102 | — | — | 5 | 15,200 | 14,440 | 5 | Thick but compat., sl. gr., | 1000+ | Absolutely perfect passes |

TABLE IV-continued

Soaps of 95.5 Acid No. Hydrocarbon Wax Oxidate, 0.3 Wt. % TEPA and 0.5% Butyl Cellosolve

| Example | Wt. % Calcium Sulfonate | Stochiometric % Lime | Wt. %+ Copolymer A | Wt. %+ Copolymer C | Wt. %+ Copolymer E | Brookfield Vis. 2.5 RPM | Brookfield Vis. 20 RPM | Film Thickness (MILS) | Film Characteristics | Salt Spray (Hrs to Failure) | Comments |
|---|---|---|---|---|---|---|---|---|---|---|---|
| Ex. 10 | 5 | 101 | 0.5 | — | 0.5 | 9,9360 | 9,600 | 5 | Dry, glossy smooth | 1000 | Decent pass (<1% corrosion) |
| Ex. 11 | 5 | 101 | 1.0 | — | 1.0 | 3,600 | 3,750 | 3 | Dry, smooth | 1000 | Borderline pass/fail (0-3% corrosion) |
| Ex. 12 | 2 | 101 | — | 2 | — | 25,120 | 22,000 | 10 | Enhanced drying time, smooth, compat. | 1000+ | Good pass |
| Ex. 13 | 2 | 98 | — | 0.5 | 0.5 | 6,000 | 6,040 | 3 | Dry, sl. grainy | 1000+ | Decent pass |
| Ex. 14 | 2 | 98 | — | 1.0 | 1.0 | 2,240 | 2,360 | 3 | Dry, sl. grainy | 1000+ | Decent pass |
| Ex. 15 | 2 | 99 | — | 2.0 | 1.0 | 7,440 | 7,350 | 4 | Dry, smooth | 1000+ | Good pass |
| Ex. 16 | 2 | 99 | — | 1.5 | 1.5 | 8,000 | 7,960 | 3.5 | Dry, smooth | 1000+ | Good pass |
| Ex. 17 | 4 | 100 | — | 1.5 | 1.0 | 11,920 | 12,340 | 4 | Dry, sl. grainy | 1000+ | Good pass |
| Ex. 18 | 4 | 100 | — | 1.0 | 2.0 | 9,200 | 8,800 | 4 | Just sl. tacky, smooth | 1000+ | Excellent pass |

*Acid number 92.0.
+Approximate weight based on the hydrocarbon oxidate used.

The results in Table II above demonstrate that the addition of ethyleneacrylic acid copolymer to the hydrocarbon wax oxidate increases the viscosity thereof and provides for a dry film and greater salt spray resistance than in the absence of the copolymer. Ethyleneacrylic Acid Copolymers F and G, when added to the hydrocarbon wax oxidate, also bring about an improvement in viscosity, film characteristics and salt spray resistance. Similar results are achieved with the addition of ethylene-vinyl-acetate copolymer to the hydrocarbon wax oxidate.

The results in Table III above demonstrate that the addition of either ethylene-acrylic acid or ethylene-vinyl-acetate copolymer to a hydrocarbon wax-petrolatum oxidate yields a film which has increased salt spray resistance.

An increased stochiometric % of lime provides for soaps with better characteristics, i.e. higher viscosity and film thickness, while an increased concentration of the polymer results in a shorter drying time and raises soap viscosity without affecting the film thickness thereof. In addition, an increased concentration of the metal salt results in both greater viscosity and film thickness. Moreover, the higher the acid number the more sensitive the viscosity of the soap is to lime.

The results in Table IV above demonstrate that ethylene vinyl-acetate copolymer, when used at lower concentrations, is more effective and that lower concentrations of the metal salt enhances the drying time of the film while still providing good salt spray resistance. Further, calcium sulfonate is better than sodium sulfonate as the metal salt.

It has also been found that a somewhat lower acid number hydrocarbon wax oxidate, i.e. 73.5, can be used with ethylene-vinyl acetate. This is important since high acid number soaps are more sensitive, in terms of viscosity, to further lime additions.

Furthermore, as Table IV evidences, when using a combination of ethylene-vinyl acetate and ethylene-acrylic acid, a reduced amount of copolymer is required in order to provide an effective soap and hence reduces the cost of the soaps. In addition, the use of a combination of copolymers compensates for a reduction in the amount of petroleum sulfonate employed.

While the invention has been described in detail and with respect to specific embodiments thereof, it will be apparent that changes and modifications can be made therein without departing from the spirit and scope thereof.

What is claimed is:

1. A hydrocarbon oxidate composition having a sinewy or film-forming characteristic comprising the reaction product of:
    (a) a hydrocarbon oxidate, with
    (b) a polyamine containing at least two amino groups, each group having at least one active hydrogen atom; and
    (c) at least one copolymer of an olefin and a comonomer selected from (i) an unsaturated carboxylic acid; or (ii) a vinyl ester of a saturated carboxylic acid; or the metal salt of said reaction product.

2. The composition of claim 1, wherein said hydrocarbon oxidate is a hydrocarbon wax oxidate, a petrolatum oxidate or mixtures thereof having an acid number ranging from about 35 to about 120.

3. The composition of claim 2, wherein said mixture of the hydrocarbon wax oxidate and petrolatum oxidate is produced by mixing the corresponding hydrocarbon wax and petrolatum and then oxidating the mixture.

4. The composition of claim 2, wherein said mixture of the hydrocarbon wax oxidate and petrolatum oxidate is produced by oxidating the hydrocarbon wax and petrolatum separately and then mixing the oxidates.

5. The composition of claim 1, wherein said reaction product comprises said hydrocarbon oxidate.

6. The composition of claim 1, wherein said reaction product comprises the metal salt of said hydrocarbon oxidate.

7. The composition of claim 1, wherein said polyamine is a diamine, a triamine, a tetramine or a pentamine.

8. The composition of claim 1, wherein said polyamine is an aliphatic polyamine, an alicyclic polyamine, an aromatic polyamine or a heterocyclic polyamine.

9. The composition of claim 1, wherein said polyamine is triethylene tetramine, diethylene triamine, tetraethylene pentamine, hexamethylene diamine, ethylene diamine, or piperazine.

10. The composition of claim 1, wherein said polyamine is tetraethylene pentamine.

11. The composition of claim 1, wherein said polyamine is a polyfunctional amino group containing nitrogen compound from hydrogenated coal or shale oil.

12. The composition of claim 1, wherein said olefin contains from 2 to 4 carbon atoms.

13. The composition of claim 12, wherein said olefin is selected from the group consisting of ethylene, propylene, 1-butene and isobutylene.

14. The composition of claim 12, wherein said unsaturated carboxylic acid contains from 3 to 5 carbon atoms.

15. The composition of claim 1, wherein said unsaturated carboxylic acid contains from 3 to 5 carbon atoms.

16. The composition of claim 15, wherein said unsaturated carboxylic acid is acrylic acid, methacrylic acid, crotonic acid or itaconic acid.

17. The composition of claim 1, wherein said vinyl ester of a saturated carboxylic acid contains 4 to 14 carbon atoms.

18. The composition of claim 1, wherein said vinyl ester of a saturated carboxylic acid is selected from the group consisting of vinyl acetate, vinyl propionate, vinyl butanoate and vinyl laurate.

19. The composition as in claim 1, wherein said copolymer is ethylene-vinyl acetate.

20. The composition as in claim 19, wherein said ethylene-vinyl acetate copolymer has a vinyl acetate concentration of 2 to 80% by weight.

21. The composition as in claim 1, wherein said copolymer is ethylene-acrylic acid.

22. The composition as in claim 21, wherein said ethylene-acrylic acid copolymer has an acid number of 5 to 120.

23. The composition as in claim 21, wherein said ethylene-acrylic acid copolymer has an acrylic acid concentration of 0.64 to 15.4 by weight.

24. The composition of claim 1, wherein said composition has a viscosity ranging from about 1000 to about 250,000 CPS at about 25° C.

25. The composition of claim 1, wherein said metal salt is a salt of lithium, sodium, potassium, magnesium, rubidium, strontium, cesium, barium, cadmium, aluminum, tin, bismuth or zinc.

26. The composition of claim 1, wherein said salt is the calcium salt or the zinc salt.

27. The composition of claim 1, wherein said salt is the calcium salt.

28. A method for altering the characteristics of hydrocarbon oxidate or the metal salts thereof comprising forming the reaction product of:
(a) a hydrocarbon oxidate, with (b) a polyamine having at least two amino groups, each group having at least one active hydrogen atom; and
(c) at least one copolymer of an olefin and a comonomer selected from an (i) unsaturated carboxylic acid; or (ii) a vinyl ester of a saturated carboyxlic acid;

or a metal salt of said reaction product, by reacting, in any order:
said oxidate (a); with
said polyamine (b); and
said copolymer (c);
if necessary, forming said metal salt prior to or subsequent to reacting components (a), (b) and (c).

29. The composition of claim 28, wherein said hydrocarbon oxidate is a hydrocarbon wax oxidate, a petrolatum oxidate or mixtures thereof having an acid number ranging from about 35 to about 120.

30. The composition of claim 28, wherein said mixture of the hydrocarbon wax oxidate and petrolatum oxidate is produced by mixing the corresponding hydrocarbon wax and petrolatum and then oxidating the mixture.

31. The composition of claim 28, wherein said mixture of the hydrocarbon wax oxidate and petrolatum oxidate is produced by oxidating the hydrocarbon wax and petrolatum separately and then mixing the oxidates.

32. The method of claim 28, wherein said polyamine is a diamine, a triamine, a tetramine or a pentamine.

33. The method of claim 28, wherein said polyamine is an aliphatic polyamine, an alicyclic polyamine, an aromatic polyamine or a heterocyclic polyamine.

34. The method of claim 28, wherein said polyamine is triethylene tetramine, diethylene triamine, tetraethylene pentamine, hexamethylene diamine, ethylene diamine, or piperazine.

35. The method of claim 28, wherein said polyamine is tetraethylene pentamine.

36. The method of claim 28, wherein said olefin contains from 2 to 4 carbon atoms.

37. The method of claim 28, wherein said olefin is selected from the group consisting of ethylene, propylene, 1-butene and isobutylene.

38. The method of claim 36, wherein said unsaturated carboxylic acid contains from 3 to 5 carbon atoms.

39. The method of claim 28, wherein said unsaturated carboxylic acid contains from 3 to 5 carbon atoms.

40. The method of claim 28, wherein said unsaturated carboxylic acid is acrylic acid, methacrylic acid, crotonic acid or itaconic acid.

41. The method of claim 28, wherein said vinyl ester of a saturated carboxylic acid contains 4 to 14 carbon atoms.

42. The method of claim 28, wherein said vinyl ester of a saturated carboxylic acid is selected from the group consisting of vinyl acetate, vinyl propionate, vinyl butanoate and vinyl laurate.

43. The method as in claim 28, wherein said copolymer is ethylene-vinyl acetate.

44. The method as in claim 43, wherein said ethylene-vinyl acetate copolymer has a vinyl acetate concentration of 2 to 80% by weight.

45. The method as in claim 28, wherein said copolymer is ethylene-acrylic acid.

46. The composition as in claim 45, wherein said ethylene-acrylic acid copolymer has an acid number of 5 to 120.

47. A method of producing a hydrocarbon oxidate composition comprising reacting simultaneously or in any order:
(a) a hydrocarbon oxidate, with
(b) a polyamine having at least two amino groups, each group having at least one active hydrogen atom, and
(c) at least one copolymer of an olefin and comonomer selected from an (i) unsaturated carboxylic acid, or (ii) a vinyl ester of a saturated carboxylic acid.

48. A method of producing a metal salt of a hydrocarbon oxidate composition comprising reacting simultaneously or in any order:
(a) a hydrocarbon oxidate, with
(b) a polyamine having at least two amino groups, each group having at least one active hydrogen atom,
(c) at least one copolymer of an olefin and a comonomer selected from (i) an unsaturated carboxylic acid; or (ii) a vinyl ester of a saturated carboxylic acid, and
(d) a metal salt forming compound.

49. The method of claim 47, wherein said oxidate (a) is a hydrocarbon wax oxidate, a petrolatum oxidate or a mixture thereof, having an acid number ranging from about 35 to about 120.

50. The method of claim 48, wherein said oxidate (a) is a hydrocarbon wax oxidate, a petrolatum oxidate or a mixture thereof, having an acid number ranging from 35 to about 120.

51. The composition of claim 47, wherein said mixture of the hydrocarbon wax oxidate and petrolatum oxidate is produced by mixing the corresponding hydrocarbon wax and petrolatum and then oxidating the mixture.

52. The composition of claim 48, wherein said mixture of the hydrocarbon wax oxidate and petrolatum oxidate is produced by mixing the corresponding hydrocarbon wax and petrolatum and then oxidating the mixture.

53. The composition of claim 47, wherein said mixture of the hydrocarbon wax oxidate and petrolatum oxidate is produced by oxidating the hydrocarbon wax and petrolatum separately and then mixing the oxidates.

54. The composition of claim 48, wherein said mixture of the hydrocarbon wax oxidate and petrolatum oxidate is produced by oxidating the hydrocarbon wax and petrolatum separately and then mixing the oxidates.

55. The method of claim 47, wherein said polyamine is a diamine, a triamine, a tetramine or a pentamine.

56. The method of claim 48, wherein said polyamine is a diamine, a triamine, a tetramine or a pentamine.

57. The method of claim 47, wherein said polyamine is an aliphatic polyamine, an alicyclic polyamine, an aromatic polyamine or a heterocyclic polyamine.

58. The method of claim 48, wherein said polyamine is an aliphatic polyamine, an alicyclic polyamine, an aromatic polyamine or a heterocyclic polyamine.

59. The method of claim 47, wherein said polyamine is triethylene tetramine, diethylene triamine, tetraethylene pentamine, hexamethylene diamine, ethylene diamine, or piperazine.

60. The method of claim 48, wherein said polyamine is triethylene tetramine, diethylene triamine, tetraethylene pentamine, hexamethylene diamine, ethylene diamine, or piperazine.

61. The method of claim 47, wherein said polyamine is tetraethylene pentamine.

62. The method of claim 48, wherein said polyamine is tetraethylene pentamine.

63. The method of claim 47, wherein said polyamine is a polyfunctional amino group containing nitrogen compound from hydrogenated coal or shale oil.

64. The method of claim 48, wherein said polyamine is a polyfunctional amino group containing nitrogen compound from hydrogenated coal or shale oil.

65. The method of claim 47, wherein said metal salt is a salt of lithium, sodium, potassium, magnesium, rubidium, strontium, cesium, barium, cadmium, aluminum, tin, bismuth or zinc.

66. The method of claim 48, wherein said salt is the calcium salt or the zinc salt.

67. The method of claim 48, wherein said salt is the calcium salt.

68. The method of claim 47, wherein said olefin contains from 2 to 4 carbon atoms.

69. The method of claim 48, wherein said olein contains from 2 to 4 carbon atoms.

70. The method of claim 47, wherein said olefin is selected from the group consisting of ethylene, propylene, 1-butene and isobutylene.

71. The method of claim 48, wherein said olefin is selected from the group consisting of ethylene, propylene, 1-butene and isobutylene.

72. The method of claim 68 wherein said unsaturated carboxylic acid contains from 3 to 5 carbon atoms.

73. The method of claim 69 wherein said unsaturated carboxylic acid contains from 3 to 5 carbon atoms.

74. The method of claim 47, wherein said unsaturated carboxylic acid contains from 3 to 5 carbon atoms.

75. The method of claim 48, wherein said unsaturated carboxylic acid contains from 3 to 5 carbon atoms.

76. The method of claim 47, wherein said unsaturated carboxylic acid is acrylic acid, methacrylic acid, crotonic acid or itaconic acid.

77. The method of claim 48, wherein said unsaturated carboxylic acid is acrylic acid, methacrylic acid, crotonic acid or itaconic acid.

78. The method of claim 47, wherein said vinyl ester of a saturated carboxylic acid contains 4 to 14 carbon atoms.

79. The method of claim 48, wherein said vinyl ester of a saturated carboxylic acid contains 4 to 14 carbon atoms.

80. The method of claim 47, wherein said vinyl ester of a saturated carboxylic acid is selected from the group consisting of vinyl acetate, vinyl propionate, vinyl butanoate and vinyl laurate.

81. The method of claim 48, wherein said vinyl ester of a saturated carboxylic acid is selected from the group consisting of vinyl acetate, vinyl propionate, vinyl butanoate and vinyl laurate.

82. The method as in claim 47, wherein said copolymer is ethylene-vinyl acetate.

83. The method as is claim 48, wherein said copolymer is ethylene-vinyl acetate.

84. The method as in claim 47, wherein said ethylene-vinyl acetate copolymer has a vinyl acetate concentration of 2 to 80% by weight.

85. The method as in claim 48, wherein said ethylene-vinyl acetate copolymer has a vinyl acetate concentration of 2 to 80% by weight.

86. The method as in claim 47, wherein said copolymer is ethylene-acrylic acid.

87. The method as in claim 48, wherein said copolymer is ethylene-acrylic acid.

88. The method as in claim 47, wherein said ethylene-acrylic acid copolymer has an acid number of 5 to 120.

89. The method as in claim 48, wherein said ethylene-acrylic acid copolymer has an acid number of 5 to 120.

* * * * *